Figure 6:
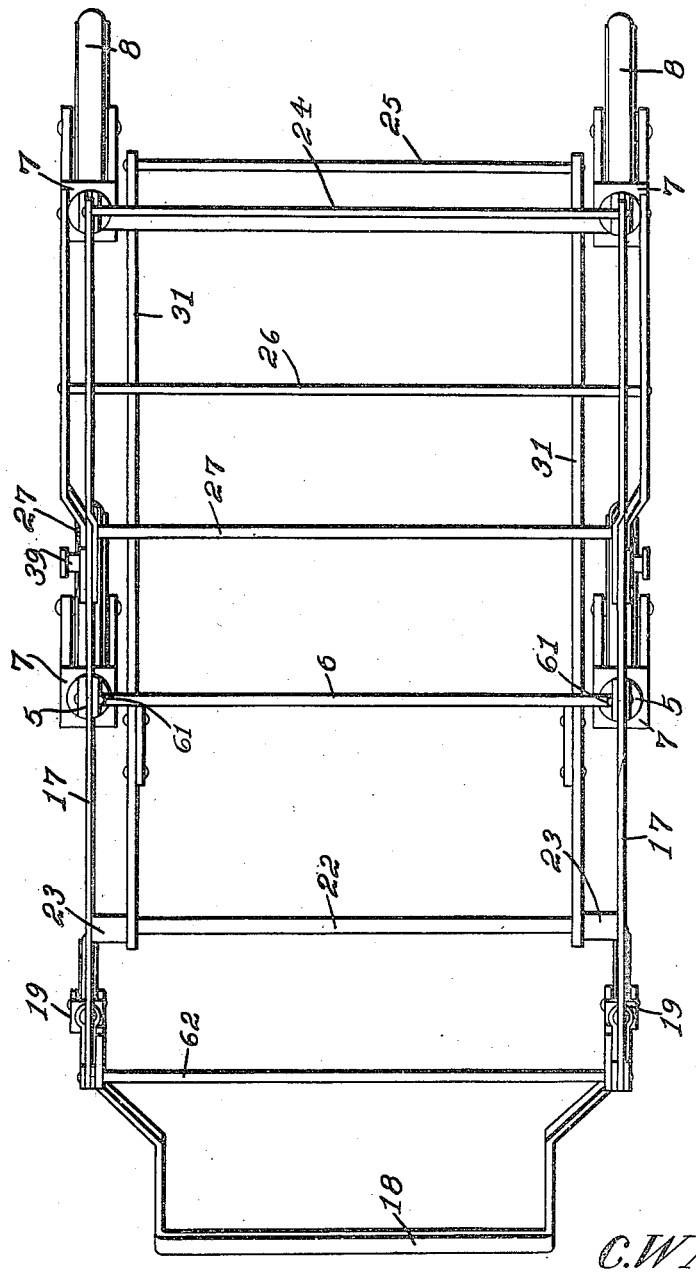

C. W. ALLEBRAND AND C. G. GUYATT.
UTILITY CARRIAGE DEVICE.
APPLICATION FILED JULY 25, 1921.
1,431,862.
Patented Oct. 10, 1922.
3 SHEETS—SHEET 1.
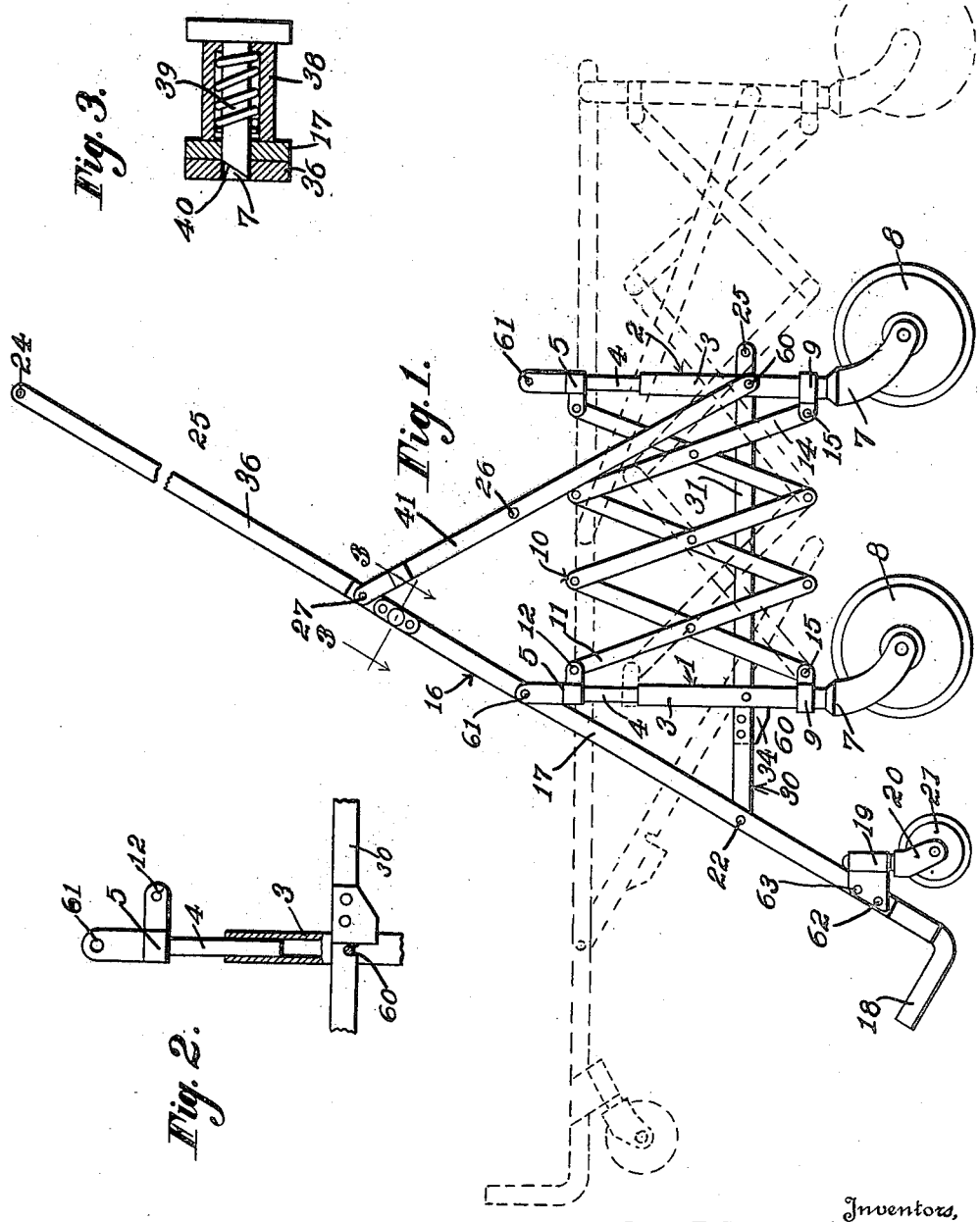
Inventors,
C. W. Allebrand,
C. G. Guyatt.
By
Attorney

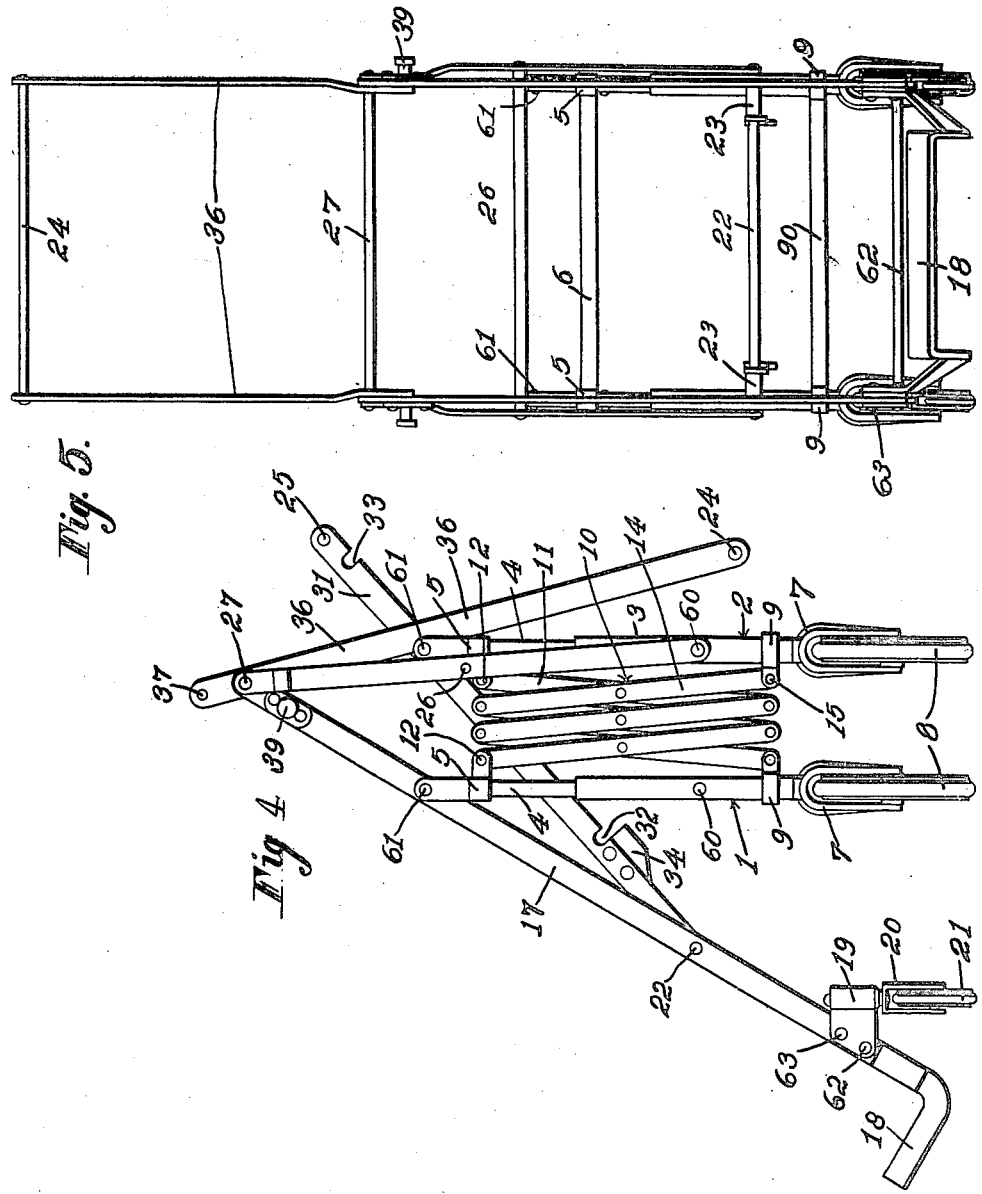

Patented Oct. 10, 1922.

1,431,862

UNITED STATES PATENT OFFICE.

CHARLES W. ALLEBRAND AND CHRISTOPHER G. GUYATT, OF DUQUESNE, PENNSYLVANIA.

UTILITY CARRIAGE DEVICE.

Application filed July 25, 1921. Serial No. 487,535.

*To all whom it may concern:*

Be it known that we, CHARLES W. ALLEBRAND and CHRISTOPHER G. GUYATT, citizens of the United States, residing at Duquesne, in the county of Allegheny, State of Pennsylvania, have invented a new and useful Utility Carriage Device, of which the following is a specification.

The device forming the subject matter of this application is a truck, adapted to be used for handling coffins and other relatively long objects, the construction being such that the coffin or the like may be carried horizontally when vertical space is limited, and be carried in an approximately vertical position, when horizontal space is limited.

The invention aims to provide a truck capable of carrying out the operation above alluded to, novel means being provided for holding the operative parts of the truck in proper relation with respect to each other.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a truck constructed in accordance with the invention, the platform of the truck being shown in solid line, in an inclined position, and being shown in dotted line, in horizontal position; Figure 2 is a sectional detail illustrating the posts and the brace; Figure 3 is a sectional detail disclosing the latch; Figure 4 is a side elevation wherein the truck is shown folded up; Figure 5 is an elevation wherein the truck is viewed endwise, the structure being in the position depicted in Figure 1; Figure 7 is a top plan of the truck when the same is in the form shown in Figure 1.

The device forming the subject matter of this application includes telescopic posts 1 and 2, each post including a lower tubular member 3 and an upper member 4 mounted to slide in the lower tubular member 3. The upper members 4 of the posts are provided, each, with a head 5. The heads 5 are connected by transverse bars 6. The tubular lower members 3 of the posts 1 and 2 are connected by a lower bar 60. Castor frames 7 are swiveled in the lower ends of the members 3 and carry wheels 8. Brackets 9 are mounted on the members 3, the brackets 9 being connected by transverse bars 90.

Lazy tongs frames 10 are supplied comprising members 11 pivoted at 12 to the heads 5, and, consequently, to the upper members 4 of the posts 1 and 2. The lazy tongs frames 10 comprise members 14, pivoted at 15 to the brackets 9, and, consequently, to the lower members 3 of the posts 1 and 2.

The device includes a platform 16 which is a composite structure. The platform 16 includes a main member, embodying side rails 17. The side rails 17 are pivoted at 61 to the heads 5 of the upper members 4 of the posts 1. The side rails 17 are connected by a bar 22, located adjacent to the forward ends of the side rails. The forward ends of the side rails 17 are connected by a bar 62. The numeral 18 denotes a foot piece which extends at right angles to the rails 17, the foot piece 18 being mounted on the bar 62 and being held to the rails 17 by securing elements 63. The parts 62 and 63 retain brackets 19 on the side rails 17 of the main member of the platform 16. Castor frames 20 are swiveled in the brackets 19 and carry wheels 21.

The device includes a brace denoted generally by the numeral 30 and including side rails 31 mounted pivotally on the bar 22, spacers 23 being carried by the bar 22 and being located between the rails 17 of the main member of the platform, and the rails 31 of the brace. The rails 31 of the brace are connected at their free ends by a rod 25. The rails 31 of the brace 30 are provided with seats 32 and 33, stops 34 being secured to the said rails, and being located adjacent to the seats 32.

The platform embodies an auxiliary member 35 made up of side rails 36 connected at their outer ends by a rod 24, the rails 36 being mounted to swing, intermediate their ends, and relatively near to their inner ends on the rod 27 which forms part of the main member of the platform. At their inner ends, the rails 36 are supplied with openings or keepers 37. Casings 38 are mounted on the side rails 17 of the main member of the platform and carry spring pressed latches 39, under the control of an operator. The latches 39 are beveled at their inner ends, as shown at 40.

Links 41 are mounted to swing on the bar 60 of the posts 2. The upper ends of the links 41 are mounted pivotally on the rod 27 which forms a pivotal connection between the auxiliary section 35 of the platform and the main section 16 thereof. The links 41 are connected by rods 26.

When the parts are arranged as shown in Figure 1, the latches 39 are engaged in the keepers 37, and the auxiliary section of the platform is held in alinement with the main section 16, as shown in Figure 1, the platform standing at an angle to the vertical, the seats 32 of the brace 30 being engaged with the rod 60 of the posts 1, and the seat 33 of the brace being engaged with the rod 60 of the posts 2, the lazy tongs being contracted and the structure being held rigidly in the position shown in Figure 1. It is obvious that a coffin or other elongated object may be placed on the platform and be supported by the foot piece 18, it being possible to trundle the coffin or other article along on the truck, the wheels 8 and 21 rolling in contact with the ground. When it is desired to dispose the platform and the object thereon in a horizontal position, the rear end of the platform is pulled downwardly, the brace 30 having been disengaged from the rods 60. Such an operation may be desirable when, for instance, it is desired to pass the truck through a door. When the parts are manipulated as above described, the platform assumes a horizontal position and rests on the bar 6 which connects the members 4 of the posts 2. The lazy tongs 10 expand, as indicated in dotted line in Figure 1, and the member 4 of the posts 1 and 2 slide downwardly in the members 3 of the post.

When it is desired to dispose the device in small compass, the same may be folded up, as shown in Figure 4.

What is claimed is:—

1. In a device of the class described, a truck comprising front and rear posts including telescoped upper and lower members; lazy tongs including parts pivoted to the upper members, and parts pivoted to the lower members; a platform pivoted to swing in a vertical plane on the upper members of the front posts; and a link pivoted to the platform and to one of the rear posts, whereby the lowering of the platform will automatically extend said lazy tongs and the raising thereof contract them.

2. In a device of the class described, a truck comprising front and rear posts including telescoped upper and lower members; lazy tongs including parts pivoted to the upper members, and parts pivoted to the lower members; a platform pivoted to swing in a vertical plane on the upper members of the front posts; a link pivotally connected with the platform and to one of the rear posts; and a brace having means for detachably engaging the posts to lock the lazy tongs contracted and the platform in raised position.

3. A device of the class described, constructed as set forth in claim 2 and further characterized by the fact that the brace is pivoted to the platform.

4. A device of the class described constructed as set forth in claim 3, and further characterized by the fact that the platform embodies main and auxiliary portions pivoted for relative movement, and a latch mechanism coacting with said portions of the platform to hold the same in alinement.

5. In an apparatus of the class described, an extensible frame including front and rear posts, and a platform pivoted on said front posts to swing in a vertical plane, said frame being automatically extended on the lowering of said platform and contracted on the raising thereof.

6. In an apparatus of the class described, a supporting structure, upper and lower frames mounted thereon, said lower frame including front and rear posts, the upper frame being pivoted to swing in a vertical plane on said front posts, the lower frame being extensible on the lowering of the upper frame and contractable on its raising.

7. In an apparatus of the class described, a supporting structure, upper and lower frames mounted thereon, said lower frame including front and rear posts, united by a lazy tong structure, the upper frame being pivoted to swing in a vertical plane on said front posts, and a connection between said upper and lower frames, whereby the lowering of the upper frame will extend said lower frame and the raising of said upper frame will contract the lower frame.

8. In an apparatus of the class described, a supporting structure, upper and lower frames mounted thereon, said lower frame including front and rear posts, united by a lazy tong structure, the upper frame being pivoted to swing in a vertical plane on said front posts, and a link connection between said upper and lower frames, whereby the lowering of the upper frame will extend said lower frame and the raising of said upper frame will contract said lower frame.

In testimony that we claim the foregoing as our own, we have hereto affixed our signatures in the presence of two witnesses.

CHARLES W. ALLEBRAND.
CHRISTOPHER G. GUYATT.

Witnesses:
JOHN A. CONLIN,
CARL F. ALLEBRAND.